United States Patent [19]

Lakin

[11] Patent Number: 4,645,361
[45] Date of Patent: Feb. 24, 1987

[54] END SHIELD WITH CYLINDRICAL BEARING MOUNT

[75] Inventor: Bryan L. Lakin, Springfield, Mo.

[73] Assignee: Fasco Industries, Inc., Boca Raton, Fla.

[21] Appl. No.: 805,813

[22] Filed: Dec. 6, 1985

[51] Int. Cl.⁴ .............................................. F16C 35/02
[52] U.S. Cl. ...................................... 384/441; 384/537
[58] Field of Search .............. 384/517, 537, 441, 903, 384/208; 308/DIG. 3, DIG. 11

[56] References Cited

U.S. PATENT DOCUMENTS

| | | |
|---|---|---|
| 3,037,822 | 6/1962 | Plummer . |
| 3,081,411 | 3/1963 | Wiley . |
| 3,157,805 | 11/1964 | Hoffmeyer . |
| 3,167,672 | 1/1965 | Tupper . |
| 3,371,236 | 2/1968 | Swanke . |
| 3,391,290 | 7/1968 | Hahndorf . |
| 3,437,853 | 4/1969 | Arnold . |
| 3,518,471 | 6/1970 | Wightman . |
| 3,529,874 | 9/1970 | Hoddy . |
| 3,544,820 | 12/1970 | Wightman . |
| 3,555,320 | 1/1971 | Johnson . |
| 3,624,434 | 11/1971 | Dafler . |
| 3,758,799 | 9/1973 | Dochterman . |
| 3,789,251 | 1/1974 | King . |
| 3,794,869 | 2/1974 | Apostoleris . |
| 3,846,652 | 11/1974 | Lykes . |
| 3,900,234 | 8/1975 | Roddy . |
| 4,017,964 | 4/1977 | Schulte . |
| 4,118,644 | 10/1978 | Schulte . |
| 4,174,485 | 11/1979 | Soden . |
| 4,186,319 | 1/1980 | Dochterman . |
| 4,325,593 | 4/1982 | Mallet ........................... 308/DIG. 3 |
| 4,364,615 | 12/1982 | Euler ................................... 384/903 |
| 4,428,688 | 1/1984 | McGregor . |
| 4,460,285 | 7/1984 | O'Donnell . |
| 4,471,246 | 9/1984 | Paillet . |
| 4,499,391 | 2/1985 | Sakamoto . |
| 4,504,754 | 3/1985 | Stone . |

Primary Examiner—Lenard A. Footland
Attorney, Agent, or Firm—Rogers, Howell, Moore & Haferkamp

[57] ABSTRACT

An end shield for an electric motor or the like includes a generally disk shaped planar portion having a cylindrical bearing socket therein for mounting a cylindrical bearing. The socket has a cylindrical side wall and an end wall, and is formed from ears and tabs from the material of the disk such that the ears are bent out of the plane of the disk to extend at right angles to the planar portion. The ears define the cylindrical side wall of the socket. The tabs extend generally radially inwardly and define the end wall of the socket. A cylindrical bearing within the socket is retained radially and in axial alignment by the cylindrical side wall of the socket, and is restrained in an axial direction by the end wall of the socket. A spring may be mounted within the socket to resiliently preload the bearings of the motor in the axial direction.

18 Claims, 7 Drawing Figures

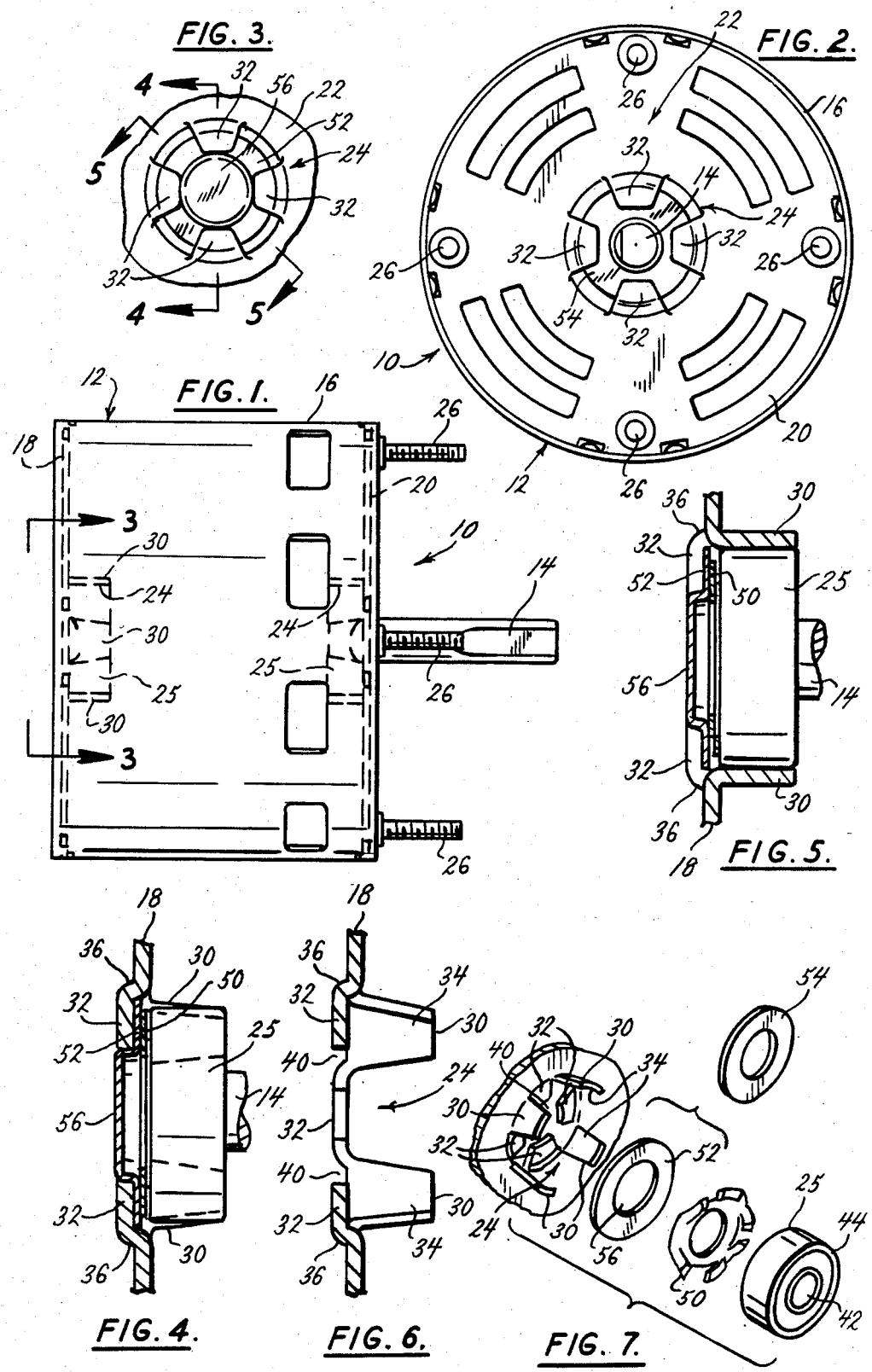

END SHIELD WITH CYLINDRICAL BEARING MOUNT

BACKGROUND AND SUMMARY OF THE INVENTION

This invention generally relates to an end shield structure for an electric motor or the like where the end shield includes a socket for mounting a cylindrical bearing, such as a ball bearing. More particularly, the invention is directed to such an end shield and its combination with other components where the socket is formed with integral one-piece construction allowing for automated assembly with minimum parts and with an improvement of quality.

Electric motors, and particularly fractional horsepower motors, must be of quality construction to give long service, and yet must be made efficiently and at low cost. Where cylindrical ball bearings are used to mount the rotor shaft, the alignment and concentricity of the bearing sockets is critical. Unlike "self-aligning bearings", the alignment of cylindrical roller bearings is determined by the sockets in which they are mounted. If the sockets are out of alignment, the bearings are out of alignment, and the life of the motor is severely shortened. Therefore, the mounts for cylindrical bearings must be precise as they retain the bearings radially and in axial alignment, and restrain them in the axial direction.

Another important consideration is that the rotor must be concentric with the stator to maintain a uniform air gap. Because the concentricity of the rotor is determined by the bearing sockets, these sockets must be precisely located.

The savings of labor and material are also crucial. This invention is specifically directed to a structure for accurately mounting cylindrical ball bearings in sockets formed in the end shields of the motor housing and where the sockets are of integral construction and may be formed with inexpensive operations using automated techniques.

Numerous structures have been used for forming sockets in end shields to support cylindrical bearings. These have included the separate fabrication of the sockets which are then secured to the end shields requiring extra labor and materials. Moreover, with such two piece construction it is difficult to accurately center the socket piece to achieve rotor and stator concentricity. The separate socket piece must be accurately centered and held in that position until secured by welding, rivets, or the like.

While integral structures are known for forming sockets for self-aligning bearings, such techniques have not been used for forming sockets for cylindrical bearings. For example, Hahndorf, et al. U.S. Pat. No. 3,391,290, Hoddy U.S. Pat. No. 3,529,874, and McGregor U.S. Pat. No. 4,428,688 each appear to disclose bearing sockets formed at least in part by the use of integral construction where the bearing socket is formed from the material of the end shield or the like. However, in each of these patents the socket is specifically for a self-aligning bearing where the bearing is allowed to align itself axially so that it may or may not be in axial alignment with the socket. In other words, there is no structure associated with the socket to align the bearing as the bearing aligns itself. Moreover, the socket of Hoddy does not appear to restrain the bearing in the axial direction.

In contrast to the sockets for self-aligning bearings as exemplified by the above referenced patents, in accordance with the present invention the integrally constructed sockets include structure that positively retain the bearings radially and in fixed axial alignment, and restrain the bearings in the axial direction. Generally, in accordance with the invention, the metal of the end shield is cut, such as by a punching operation, to define alternate ears and tabs. The ears are bent out of the plane of the end shield to extend at right angles thereto and define the cylindrical side wall of the socket. The inner surfaces of the ears are curved to generally conform to the cylindrical side of the bearing. The tabs are also bent out of the plane of the end shield to be outwardly offset from the plane but extend generally radially inwardly to define the end wall of the socket. The cylindrical bearing within the socket is retained radially and in fixed axial alignment by the cylindrical side wall of the socket, and is restrained in one axial direction by the end wall of the socket. While the cylindrical bearing mount of this invention contains the bearing, it permits axial movement within the restraints of the end walls so that the bearings may be preloaded, as is customary in ball bearing motors.

The sockets in the end shields at opposite ends of the motor housing are in axial alignment and are accurately centered so that the rotor and stator are concentric. At least one of the sockets may include within it a spring for resiliently preloading the bearings in the axial direction. The spring is located between the bearing and the end wall of the socket, and there may be included a washer or cap depending on whether an open or closed configuration is desired.

Therefore, it is a primary advantage of the present invention that the sockets for the cylindrical bearings are formed integrally with the end shield so that separate sockets and the additional labor and materials required to assemble them to the end shield are not required. The sockets accurately position the cylindrical bearings radially, and retain them in axial alignment. They also restrain the bearings axially, but allow them to move axially within the sockets within those restraints to provide preloading. The sockets may be formed with minimum labor and material loss by use of automated techniques.

These and other objects and advantages of the invention are apparent from the description to follow.

BRIEF DESCRIPTION OF THE DRAWINGS

FIG. 1 is a side elevation view of an electric motor incorporating cylindrical bearing mounting structures in accordance with the present invention;

FIG. 2 is a right end view of the motor of FIG. 1;

FIG. 3 is a view taken generally along the line 3—3 of FIG. 1;

FIG. 4 is a view in section taken generally along the line 4—4 of FIG. 3;

FIG. 5 is a view in section taken generally along the line 5—5 of FIG. 3;

FIG. 6 is a view in section similar to that of FIG. 4, but showing only the socket; and FIG. 7 is an exploded view showing the relative positions of the socket, cylindrical bearing, spring, and other components.

DETAILED DESCRIPTION OF A PREFERRED EMBODIMENT

With reference to the drawing there is shown an electric motor 10 or the like including a housing 12 for enclosing a stator, rotor, and other components including a rotor shaft 14. The housing includes a cylindrical sleeve 16 of circular cross section and end shields 18 and 20 enclosing the ends of the sleeve. The end shields are of the same construction, each having a generally disk shaped planar portion 22 with a centrally located socket 24 therein. The sockets of the end shields 18 and 20 are axially aligned and their purpose is to support cylindrical bearings such as cylindrical ball bearings 25 for rotatably mounting the rotor shaft. The end shields 18 and 20 are attached to the sleeve 16 by any suitable means known in the art such that the end shields are perpendicular to the axis of the sleeve and accurately spaced apart in parallel relation with the sockets in axial alignment. Preferably, the end shields are secured to the sleeve in accordance with the teachings of co-pending application Ser. No. 805,877, filed Dec. 6, 1985, and entitled MOTOR HOUSING WITH END SHIELD ATTACHMENT AND METHOD OF FORMING SAME. The end shield 20 may also include mounting posts 26 for mounting the motor.

The socket 24 is formed integrally, from the same material, with the disk portion 22 such as by use of a punching operation. The central portion of the end shield is punched to define alternate ears 30 and tabs 32. The ears 30 are bent out of the plane of the disk at right angles thereto and define the cylindrical side wall of the socket. The inside surfaces 34 of the ears are curved to generally conform to the outer cylindrical side surface of the cylindrical bearing 25.

The tabs 32 are also bent out of the plane of the disk in a direction opposite to that of the ears, shown generally at 36, but extend generally radially inwardly to define the end wall of the socket. The bending of the tabs out of the plane of the disk effectively deepens the socket to give greater length for mounting the rotor shaft without lengthening the housing sleeve. Each tab and ear is tapered so as to be wider at its base as shown. The free ends of the tabs 32 are spaced from the center of the socket to define an opening 40 at the center.

In the embodiment shown there are four ears and four tabs, each of the tabs and ears being equally spaced circumferentially about the socket. Also, in the described embodiment there are alternate ears and tabs. However, it is to be understood that there may be a greater or lesser number of ears and tabs, although there should be at least two of each sufficiently spaced to define a cylindrical side wall and an end wall of the socket.

A cylindrical bearing 25 having inner and outer races 42 and 44 is mounted in each socket. The inner race 42 of the bearing is secured to the rotor shaft by any suitable means known in the art. One such means is an annular groove with a snap ring therein to axially locate the bearing, and adhesive between the inner race of the bearing and the shaft to hold it in place against the snap ring. The cylindrical side wall of the socket defined by the ears 30 is sized such that the bearing is retained radially within the groove and in axial alignment, but is allowed to move axially within the restraints of the end wall defined by the tabs 32. In other words, the fit between the bearing and the cylindrical side wall of the socket is sufficiently loose without excessive play to allow the bearing to slide axially within the restraints of the end wall. Unlike self-aligning bearings, the cylindrical bearings 25 are retained in alignment by the sockets, and with the sockets in axial alignment, the bearings 25 are also retained in axial alignment.

Preferably within at least one of the sockets is a spring, such as a wafer spring 50, the spring being located between the bearing and the end wall of the socket. Depending on whether the motor is to have a "open" or "closed" configuration, there also may be included in the socket either a cap 52 or a washer 54. If a closed configuration is desired, such as shown at the left end of the motor, the generally hat-shaped cap 52 is located within the socket between the bearing and end wall. The central portion 56 of the cap extends into the central opening 40 of the socket. If the wafer spring 50 is located at the cap end of the motor, the wafer spring is located between the bearing and the cap. If an open configuration is desired, as shown at the right end of the motor, the cap may be replaced with the washer 54. The spring, cap, and washer are very inexpensive readily available parts. Hence, this invention provides versitility with either an open or a closed configuration, either one of which may include the spring.

With a spring in at least one of the sockets, the bearings are "preloaded" such that there is always some spring action loading the bearings in the axial direction. This preloading is made possible because the sockets allow the bearings to move axially within the restraints of the end walls, while retaining the bearings radially and in axial alignment. All of this is achieved in accordance with the invention with an integral socket structure that may be produced with automated techniques without the need for separate parts and with significantly reduced material and labor costs.

There are various changes and modifications which may be made to the invention as would be apparent to those skilled in the art. However, these changes or modifications are included in the teaching of the disclosure, and it is intended that the invention be limited only by the scope of the claims appended hereto.

I claim:

1. An end shield for an electric motor or the like comprising a generally planar portion having a cylindrical bearing socket therein for mounting a cylindrical bearing within the socket, the socket having a cylindrical side wall and an end wall, the socket formed from ears and tabs from the material of the end shield, the ears being bent out of the plane of the planar portion to extend at right angles thereto and defining the cylindrical side wall of the socket, the tabs extending generally radially inwardly and defining the end wall of the socket, the ears having means to retain a cylindrical bearing within the socket, and the tabs having means to retain a cylindrical bearing within the socket in an axial direction.

2. The end shield of claim 1 wherein said tabs are outwardly offset from the planar portion of the end shield.

3. The end shield of claim 1 wherein the inside surfaces of the ears are curved to generally conform to the cylindrical side of the bearing.

4. The end shield of claim 1 wherein there are at least two such ears.

5. The end shield of claim 1 wherein there are at least two such tabs.

6. The end shield of claim 1 wherein the tabs and ears alternate, each being equally spaced circumferentially.

7. The end shield of claim 1 wherein each tab and each ear is tapered, being wider at its base than at its free end.

8. The end shield of claim 1 wherein the free ends of the tabs are spaced from the center of the socket to define a central opening in the end wall.

9. An end shield for an electric motor or the like comprising a generally disk shaped planar portion having a cylindrical bearing socket therein for mounting a cylindrical bearing within the socket, the socket having a cylindrical side wall and an end wall, the socket formed from ears and tabs from the material of the end shield, the ears being bent out of the plane of the planar portion to extend at right angles thereto, the inside surfaces of the ears being curved to generally conform to the cylindrical side of the bearing to define the cylindrical side wall of the socket, the tabs extending generally radially inwardly and being outwardly offset from the planar portion to define the end wall of the socket, there being alternate tabs and ears with the tabs equally spaced circumferentially and the ears equally spaced circumferentially, the ears having means to retain a cylindrical bearing within the socket radially and in axial alignment, and the tabs having means to retain a cylindrical bearing within the socket in an axial direction.

10. In an electric motor or the like, the combination of: a rotor mounted on a shaft, cylindrical bearings at the ends of the rotor shaft for mounting the shaft, end shields having generally planar portions with cylindrical bearing sockets therein for mounting the cylindrical bearings within the sockets, each socket having a cylindrical side wall and an end wall, each socket formed from ears and tabs from the material of the end shield, the ears being bent out of the plane of the planar portion to extend at right angles to the planar portion and defining the cylindrical side wall of the socket, the tabs extending generally radially inwardly and defining the end wall of the socket, the ears having means to retain each bearing radially and in axial alignment with the socket in which it is mounted, and the tabs having means to retain each bearing in an axial direction in the socket in which it is mounted, the sockets and hence the bearings being in axial alignment.

11. In the electric motor or the like of claim 10 further comprising spring means in at least one socket to resiliently preload the bearings in the axial direction, the sockets being sized to allow axial movement of the bearings therein within the restraints of the end walls.

12. In the electric motor or the like of claim 11 wherein the spring means is located between the bearing and the end wall of the socket in which it is mounted.

13. In the electric motor or the like of claim 12 further comprising a washer in at least one socket between the bearing and the end wall of the socket in which it is mounted.

14. In the electric motor or the like of claim 13 wherein the spring means is between the hearing and the washer.

15. In the electric motor or the like of claim 12 further comprising a closed cap in at least one socket between the bearing and the end wall of the socket in which it is mounted.

16. In the electric motor or the like of claim 15 wherein the spring means is between the bearing and the cap.

17. In the electric motor or the like of claim 10 wherein said tabs are outwardly offset from the planar portions of the end shields.

18. In the electric motor or the like of claim 10 wherein the inside surfaces of the ears are curved to generally conform to the cylindrical sides of the bearings.

* * * * *